United States Patent [19]

Komiyama et al.

[11] Patent Number: 4,706,148
[45] Date of Patent: Nov. 10, 1987

[54] MAGNETIC TAPE CASSETTE

[75] Inventors: Choji Komiyama; Kengo Oishi, both of Kanagawa, Japan

[73] Assignee: Fuji Photo Film Co., Ltd., Kanagawa, Japan

[21] Appl. No.: 769,645

[22] Filed: Aug. 27, 1985

[30] Foreign Application Priority Data

Aug. 31, 1984 [JP] Japan .................. 59-131372

[51] Int. Cl.[4] .................. G11B 23/04; G11B 15/60
[52] U.S. Cl. .................. 360/132; 360/130.21; 242/198
[58] Field of Search .......... 360/132, 93, 130.2–130.23, 360/85

[56] References Cited

U.S. PATENT DOCUMENTS

| 4,097,006 | 6/1978 | Sato | 242/199 |
| 4,363,456 | 12/1982 | Goto | 242/199 |
| 4,466,585 | 8/1984 | Maehara | 360/132 |
| 4,484,719 | 11/1984 | Schoenmakers | 242/199 |
| 4,558,387 | 12/1985 | Shiba et al. | 360/132 |

Primary Examiner—John H. Wolff
Assistant Examiner—Matthew J. Bussan
Attorney, Agent, or Firm—Sughrue, Mion, Zinn, Macpeak & Seas

[57] ABSTRACT

A magnetic tape cassette of the type in which the tape is extracted from the cassette through tape drawing openings formed at opposite sides of a central opening in the cassette for recording and reproducing. In accordance with the invention, each of the tape drawing openings in a rectangular opening defined by a lower rib protruding from the lower half case and confronting one edge of the magnetic tape, a guide formed integrally with the lower rib and having a sliding surface with which a rear surface of the magnetic tape contacts, an upper rib protruding from the upper half case and confronting the other edge of the magnetic tape, and a cassette case wall confronting a front surface of the magnetic tape. The upper rib is recessed farther inwardly of the guide than the sliding surface.

5 Claims, 4 Drawing Figures

MAGNETIC TAPE CASSETTE

BACKGROUND OF THE INVENTION

The present invention relates to magnetic tape cassettes, and more particularly to a magnetic tape cassette of the type in which recording and reproducing operations are carried out with the magnetic tape partially pulled out of the cassette.

A video tape cassette is an example of a magnetic tape cassette of this type. The video tape cassette has tape drawing openings at opposite ends of the cassette, and the magnetic tape is laid over the tape drawing openings so that it can be partially pulled out of the cassette through the tape drawing openings and brought into contact with a rotary head.

This is suitable for high-density signal recording and reproducing operations because the magnetic tape can be brought into contact with the rotary head with high accuracy. However, the above-described magnetic tape cassette still suffers from significant difficulties, which will be described with reference to FIG. 1.

FIG. 1 is a vertical sectional view of a conventional video tape cassette as viewed from the front of the left tape drawing opening 3. Left and right tape drawing openings are formed at both sides of a center opening in the front part of the cassette. In order to control the movement of the magnetic tape T in the thickness direction of the cassette, there are provided a lower rib 4 formed on the lower half case 1, a guide 5 formed integrally with the rib 4 and which has a sliding surface 6 with which the rear side of the magnetic tape makes sliding contact, an upper rib 7 formed on the upper half case 2 confronting the lower rib 4 and having the same function as the lower rib 4, and a cassette case side wall 9 provided on the side of the front surface (the magnetic layer) of the magnetic tape T. These members define the rectangular tape drawing opening 3.

The tape drawing opening 3 is formed during assembly when the upper half case 2 is placed on the lower half case 1. In this operation, the side surface 7b of the upper rib meets the peripheral surface of the guide 5 (the upper portion of the sliding surface 6). Therefore, if there are variations due to molding inaccuracies in the dimensions of the upper and lower half cases 1 and 2, a gap 10 may undesirably be formed between the guide 5 and the side surface 7b.

The movement of the magnetic tape T in the thickness direction of the cassette is controlled by the edge 4a of the lower rib 4 and the edge 7a of the upper rib 7, and the magnetic tape is run with its rear surface in sliding contact with the sliding surface 6. Therefore, sometimes the magnetic tape T may slide into the gap. In addition, for the same reason, the magnetic tape T may be disengaged from the tape extracting device of the magnetic tape recording and reproducing device when it is loaded therein. As a result, the magnetic tape T may be jammed in the device, and possibly damaged.

SUMMARY OF THE INVENTION

In view of the foregoing, an object of the invention is to provide a magnetic tape cassette in which the magnetic tape is free from the above-described difficulties at the tape drawing openings.

The foregoing object and other objects of the invention have been achieved by the provision of a magnetic tape cassette comprising upper and lower half cases which incorporates a pair of hubs on which a magnetic tape is wound and has right and left tape drawing openings at opposite sides of a central opening formed in the front part of the cassette through which the magnetic tape can be extracted from the cassette for recording and reproducing, in which, according to the invention, each of the tape drawing openings is defined by a lower rib protruding from the lower half case in such a manner as to confront one edge of the magnetic tape, a guide formed integrally with the lower rib and which has a sliding surface with which the rear surface of the magnetic tape contacts, an upper rib protruding from the upper half case in such a manner as to confront the other edge of the magnetic tape, and a cassette case wall confronting the front surface of the magnetic tape, the upper rib being recessed more inwardly of the guide than the sliding surface.

DESCRIPTION OF THE PREFERRED EMBODIMENTS

The invention will be described in detail with reference to preferred embodiments shown in the accompanying drawings.

Figure 1:
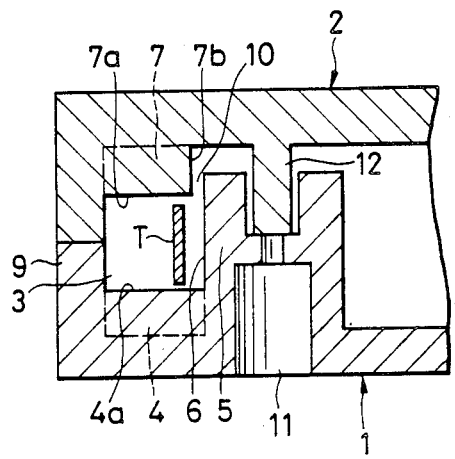
FIG. 1 is a vertical sectional view showing one of the tape drawing openings in a conventional magnetic tape cassette.
Figure 2:
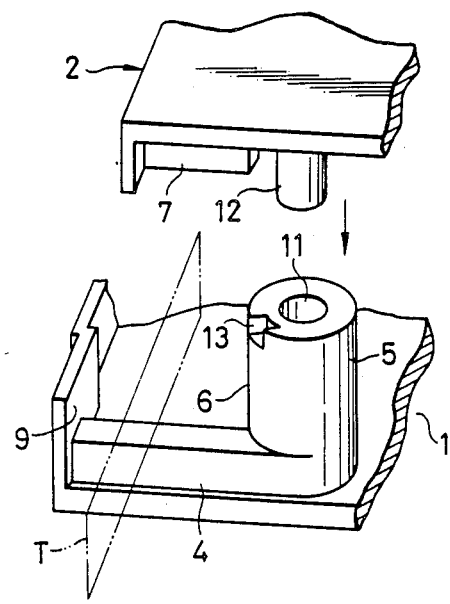
FIG. 2 is an exploded perspective view showing essential components of an example of a magnetic tape cassette according to the invention.
Figure 3:
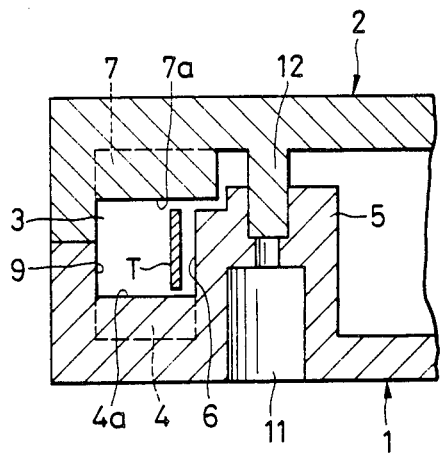
FIG. 3 is a vertical sectional view of a part of the magnetic tape cassette of FIG. 2 as viewed from the front.

FIG. 2 is an exploded perspective view showing an area around tape drawing openings of a magnetic tape cassette constructed according to the invention. FIG. 3 is a vertical sectional view of the same area shown in FIG. 1. In FIGS. 2 and 3, those components which have already been described with reference to FIG. 1 are designated by the same reference numerals or characters.

The lower ribs 4 and cylindrical guides 5 are formed at opposite ends of the opening in the front part of the cassette with the lower ribs 4 being integral with the cylindrical guides 5 (only one lower rib 4 and only one cylindrical guide 5 being shown in FIGS. 2 and 3). The lower ribs 4 and the cylindrical guide 5 extend in the longitudinal direction of the cassette. Each guide 5 has a recess 13 in its upper end face. The upper ribs 7 (described below) formed on the upper half case 2 are inserted into respective ones of the recesses 13.

The upper ribs 7 protrude from the inner surface of the upper half case 2 and mate with the lower ribs 4 when the upper and lower half cases 2 and 1 are joined together. Threaded bosses 12 provided near the upper ribs 7 are inserted into respective ones of the guides 5.

After the upper half case 2 is placed on the lower half case 1, screws or the like (not shown) are screwed into the threaded bosses 12 through the throughholes, or bores, 11 formed in the guides 5 so that the upper and lower half cases are tightly joined together.

When the upper and lower half cases 2 and 1 are joined together, the tape drawing openings 3 are formed as shown in FIG. 3 (only one tape drawing opening being shown). In other words, a rectangular tape drawing opening 3 is formed by the upper and lower ribs 4 and 7, the guide 5, and a cassette case wall 9 confronting the guide 5.

Similar to the conventional magnetic tape case, the movement of the magnetic tape T in the thickness direction of the cassette is controlled by the edge 4a of each of the lower ribs 4 and the edge 7a of each of the upper ribs 7. The tape is run with its rear surface in sliding contact with each of the sliding surfaces 6. The upper rib 7 is set back more inwardly of the guide than the sliding surface 6. Accordingly, in the magnetic tape cassette of the invention, unlike the above-described conventional cassette, no gap 10 along the sliding surface 6 (FIG. 1) is formed in the tape drawing opening 3.

The invention is not limited to the above-described embodiment shown in FIGS. 2 and 3. That is, the magnetic tape cassette may be modified as shown in FIG. 4.

Figure 4:
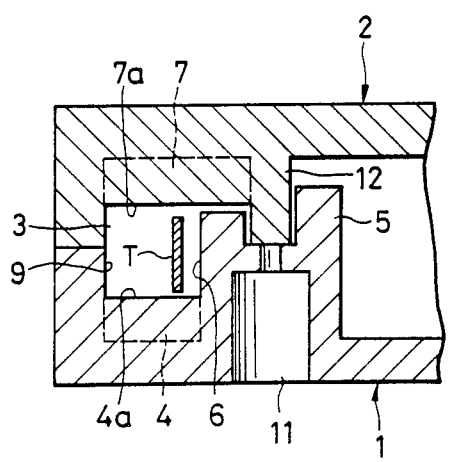
FIG. 4 is a sectional view showing essential components of a modification of the magnetic tape cassette according to the invention.

FIG. 4 is a sectional view showing essential components near the opening in the front part of the modification of the magnetic tape cassette according to the invention. In FIG. 4, those components which have been previously described with reference to FIG. 3 are therefore designated by the same reference numerals or characters.

In FIG. 4, each upper rib 7 is formed on the upper half case 2 in such a manner that it bridges the cassette case wall 9 and the threaded boss 12. The upper end portion of each guide 5 is recessed so that it receives the edge 7a of the upper rib 7 snugly when the upper and lower half cases 2 and 1 are joined together. Accordingly, in the modification also, no gap 10 (FIG. 1) is formed into which the magnetic tape T can slip.

As is apparent from the above description, the magnetic tape cassette of the invention is designed so that the upper ribs 7 are tightly engaged with respective ones of the guides. Therefore, in the magnetic tape cassette of the invention, unlike the conventional cassette, no gap is formed on extensions of the sliding surfaces and in the thickness direction of the cassette. Accordingly, the above-described difficulties of, due to the presence of the gaps, the magnetic tape T running off its regular path or the tape being jammed or damaged are eliminated with the invention.

The technical concept of the invention is applicable not only to the aforementioned video tape cassette, but also to various other magnetic tape cassettes in which the magnetic tape is pulled out of the cassette for signal recording and reproducing operations.

We claim:

1. In a magnetic tape cassette of the type having upper and lower half cases which when assembled together define at least one tape drawing opening in a front part of said cassette, through which a magnetic tape can be extracted from said cassette for recording and reproduction, the improvement comprising:

a lower rib (4) protruding from said lower half case adjacent said opening and adapted to confront a bottom edge of the magnetic tape;

a guide (5) having a generally cylindrical shape with an axial bore therein formed integrally with said lower rib and having a sliding surface (6) adapted to contact a rear surface of the magnetic tape;

an upper rib (7) protruding from said upper half case adjacent said opening and adapted to confront an upper edge of the magnetic tape;

a cassette case wall (9) adapted to confront the front surface of the magnetic tape; and said guide having a recessed portion (13) in an upper peripheral surface thereof and said upper rib being engaged with said recessed portion and extending closer to said axial bore of said guide than said sliding surface, whereby capture of said tape in a gap between said sliding surface and said upper rib is precluded.

2. In a magnetic tape cassette as set forth in claim 1, an internally threaded boss (12) extending downwardly from said upper half case received in said bore, and securing means extending through a hole in said lower half case into threaded engagement with said bore.

3. In a magnetic tape cassette as set forth in claim 2, wherein said upper rib extends continuously from a side wall of said upper half case to said boss.

4. In a magnetic tape cassette as set forth in claim 2, wherein said recessed portion in the upper peripheral surface of said cylindrical guide extends part way to said bore.

5. In a magnetic tape cassette as set forth in claim 2, wherein said recessed portion in the upper peripheral surface of said cylindrical guide extends to said bore.

* * * * *